(12) United States Patent
Yagi

(10) Patent No.: US 7,057,181 B2
(45) Date of Patent: Jun. 6, 2006

(54) RADIATION DETECTING CASSETTE

(75) Inventor: Keiichi Yagi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/843,477

(22) Filed: May 12, 2004

(65) Prior Publication Data
US 2004/0227096 A1    Nov. 18, 2004

(30) Foreign Application Priority Data
May 14, 2003    (JP)    ............... 2003-135497

(51) Int. Cl.
G01T 1/20     (2006.01)
G01T 1/24     (2006.01)
H01L 25/00    (2006.01)
H01L 27/00    (2006.01)
H01L 27/146   (2006.01)
H05G 1/64     (2006.01)

(52) U.S. Cl. .............. 250/370.09; 250/370.11; 378/98.8

(58) Field of Classification Search .............. 250/582, 250/583, 370.09, 370.11, 580; 378/98.8, 378/182, 189
See application file for complete search history.

(56) References Cited

U.S. PATENT DOCUMENTS

| | | | | |
|---|---|---|---|---|
| 5,496,182 A * | 3/1996 | Yasumura | ............ | 439/62 |
| 6,236,051 B1 * | 5/2001 | Yamakawa et al. | ...... | 250/370.1 |
| 6,268,614 B1 | 7/2001 | Imai | | |
| 6,539,076 B1 * | 3/2003 | Shoji | ............ | 378/98.8 |
| 6,825,472 B1 * | 11/2004 | Endo | ............ | 250/370.09 |
| 6,897,449 B1 * | 5/2005 | Hata | ............ | 250/370.11 |
| 2002/0014594 A1 | 2/2002 | Endo | | |
| 2005/0056789 A1 * | 3/2005 | Spahn et al. | ............ | 250/370.09 |

FOREIGN PATENT DOCUMENTS

| | | | |
|---|---|---|---|
| JP | 63198061 A | * | 8/1988 |
| JP | 2000-284056 A | | 10/2000 |
| JP | 2002-14170 A | | 1/2002 |

* cited by examiner

Primary Examiner—David Porta
Assistant Examiner—Frederick F. Rosenberger
(74) Attorney, Agent, or Firm—Sughrue Mion, PLLC

(57) ABSTRACT

A radiation detecting cassette 1 includes a casing constituted by upper and lower shell halves 11, 12 and a frame 13 fixed therein; and a solid-state radiation detector 10 which is an image pickup device. Four corners of the solid-state radiation detector 10 are sandwiched by plate springs 41 and 42 both of which are fixed to the frame 13.

9 Claims, 3 Drawing Sheets

RADIATION DETECTING CASSETTE

BACKGROUND OF THE INVENTION

1. Field of the Invention

This invention relates to a radiation detecting cassette having a radiation detector accommodated within a casing.

2. Description of the Related Art

In the field of radiography for medical diagnosis and the like, various solid-state radiation detectors (whose main part comprises semiconductors; hereinafter also simply referred to as "detectors") which detect radiation penetrating an object and produce an image signal carrying radiographic image information of the object have recently been proposed and brought into actual use (see, for example, U.S. Pat. No. 6,268,614 hereinafter referred to as Patent Reference 1 and Japanese Unexamined Patent Publication No. 2000-284056 hereinafter referred to as Patent Reference 2). Various radiation detecting cassettes having a case accommodating therein such a solid-state radiation detector and the like have also been proposed (see, for example, U.S. Patent Laid-Open No. 20020014594 hereinafter referred to as Patent Reference 3 and Japanese Unexamined Patent Publication No. 2002-014170 hereinafter referred to as Patent Reference 4).

Such a radiation detecting cassette is relatively thin and made in portable size. This allows radiophotographing with a very high-degree of freedom. For example, even for a patient who cannot move, a radiophotograph can be taken by placing the radiation detecting cassette under a body part of the patient to be radiophotographed while keeping the patient on a bed, and then moving a radiation source of a radiation image information recording apparatus to a position on a side of the patient opposite the radiation detecting cassette.

One example of a specific construction of the radiation detecting cassette is a construction in which the solid-state radiation detector and an electric circuit board for processing a signal detected by the detector are secured to a frame located inside a casing of the cassette, and the solid-state radiation detector and the electric circuit board are connected with each other via a flexible circuit board.

In order to prevent breakage of the solid-state radiation detector accommodated within such a radiation detecting cassette, Patent Reference 4 proposes a radiation detecting cassette in which a shock absorber is positioned on an upper side (i.e., a side exposed to the radiation) of the solid-state radiation detector and a lower side of the solid-state radiation detector is secured to the frame. With this configuration, the solid-state radiation detector cannot move towards the bottom of the radiation detecting cassette. Therefore, if the solid-state radiation detector is subjected to a shock in the direction towards the bottom thereof, shock cannot be absorbed.

On the other hand, when elastomeric bodies such as rubber or gel are used to sandwich the solid-state radiation detector therebetween for supporting the upper and lower surfaces of the detector as proposed in Patent Reference 3 mentioned above, it is difficult to ensure the positional precision of the solid-state radiation detector within the casing because the elastic bodies tend to change the shape.

SUMMARY OF THE INVENTION

The present invention was accomplished in view of the foregoing problems, and has an object to provide a radiation detecting cassette which improves positional precision of the solid-state radiation detector within the casing while ensuring a shock resistance of the radiation detecting cassette.

A radiation detecting cassette according to the present invention comprises: a plate-type solid-state radiation detector for recording image information carried by radiation upon exposure to the radiation and supplying an image signal representing the recorded image information; and a casing for accommodating therein the solid-state radiation detector, wherein the radiation detecting cassette further comprises plate springs disposed within and secured to the casing, and the solid-state radiation detector is sandwiched between the plate springs such that the upper and lower surfaces of the solid-state radiation detector are supported by the plate springs.

As used herein, "solid-state radiation detector" is a detector, which detects radiation carrying image information of the object and feeds out the image signal representing a radiation image of the object. The solid-state radiation detector converts the incident radiation into electric charges directly or after converting the radiation into light, accumulates the electric charges at charge accumulating sections, and thereafter feeds out the electric charges to the exterior. In this manner, the image signal representing the radiation image of the object can be obtained.

There are various types of solid-state radiation detectors. For example, from the aspect of a charge forming process for converting the radiation into electric charges, the solid-state radiation detectors may be classified into photo conversion types of solid-state radiation detectors and direct conversion types of solid-state radiation detectors. With the photo conversion types of solid-state radiation detectors, the fluorescence, which is produced by a fluorescent material when it is exposed to radiation carrying image information, is detected by a photoelectric conversion device, and the thus obtained electric charges are accumulated at a charge accumulating sections of the photoelectric conversion devices. The accumulated electric charges are then converted into an image signal (i.e., an electric signal), and the image signal is fed out. With the direct conversion types of solid-state radiation detectors, electric charges, which are generated in a radio-conductive material when it is exposed to radiation carrying image information, are collected by charge collecting electrodes and accumulated at charge accumulating sections. The accumulated charges are then converted into an electric signal, and the electric signal is fed out. On the other hand, from the aspect of a charge reading process for reading the accumulated electric charges to the exterior, the solid-state radiation detectors may be classified into, for example, thin-film transistor (TFT) reading types of solid-state radiation detectors, wherein TFT's, each of which is connected to one of the charge accumulating sections, are operated successively in order to read the accumulated electric charges, photo reading types of solid-state radiation detectors, wherein the accumulated electric charges are read by irradiating reading light (an electromagnetic wave for reading) to the solid-state radiation detectors, and improved direct conversion types of solid-state radiation detectors, which utilize a combination of the direct conversion types of techniques and the photo reading types of techniques proposed in the present applicant's Patent References 1 and 2 mentioned above. The radiation detecting cassette in accordance with the present invention may comprise any type of solid-state radiation detector housed within a case.

The plate spring preferably includes a bent portion which limits lateral shifting of the solid-state radiation detector and which provides the function of a plate spring.

The plate springs are preferably formed as at least two electrically independent components and function as an electrode connected to the radiation detecting cassette.

Thus, in the radiation detecting cassette of the invention, the solid-state radiation detector is sandwiched between and supported by the plate springs which is disposed within the casing and secured thereto, as a result of which positional precision of the solid-state radiation detector within the casing is improved while a shock resistance is ensured.

By forming in the plate springs a bent portion which limits lateral shifting of the solid-state radiation detector and which provides the function of a plate spring, a shock resistance in a lateral direction of the solid-state radiation detector is provided in addition to a shock resistance in a vertical direction.

DESCRIPTION OF THE PREFERRED EMBODIMENTS

Figure 1:
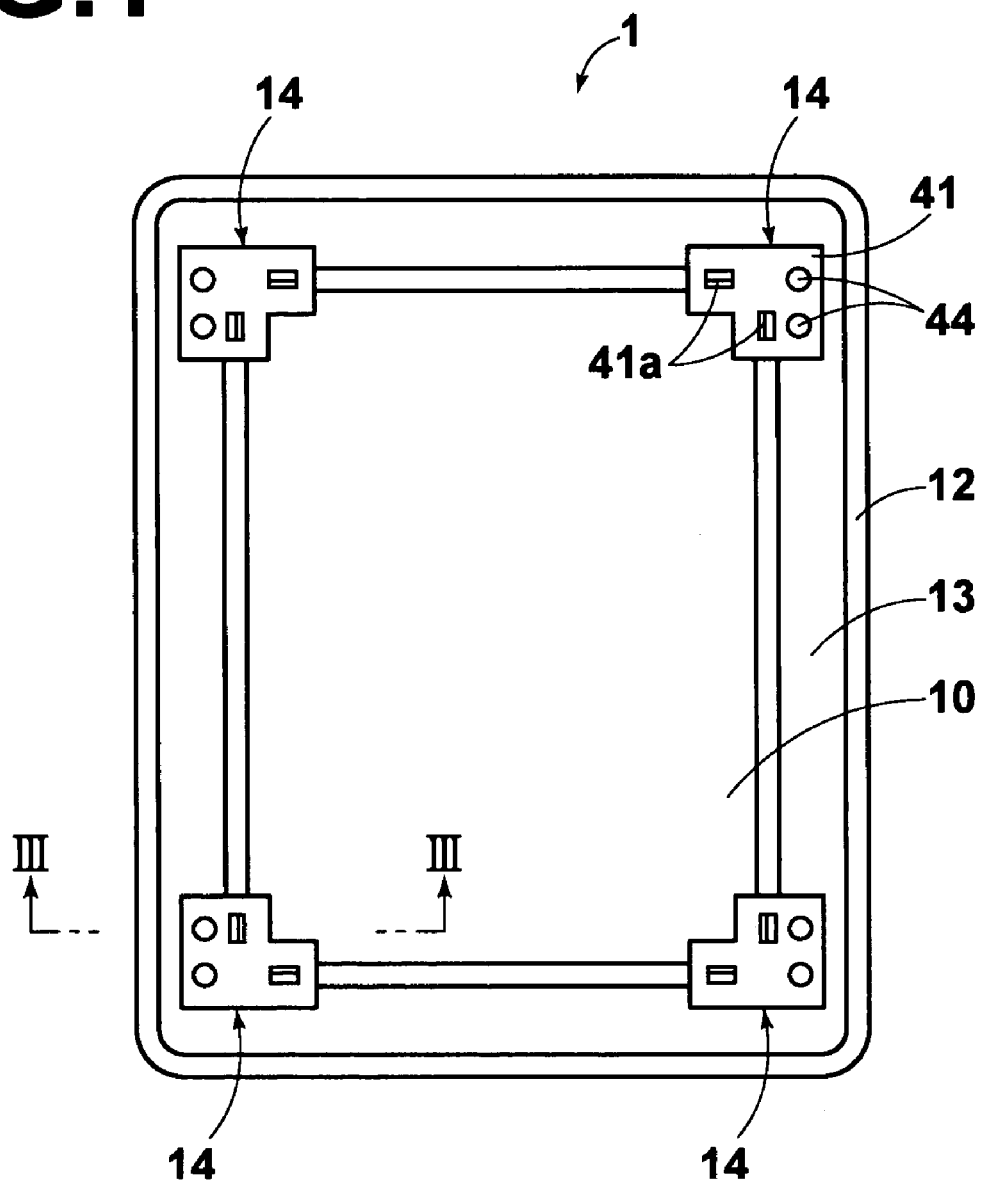
FIG. 1 is a plan view of an embodiment of a radiation detecting cassette according to the invention, with an upper shell half removed.
Figure 2A:
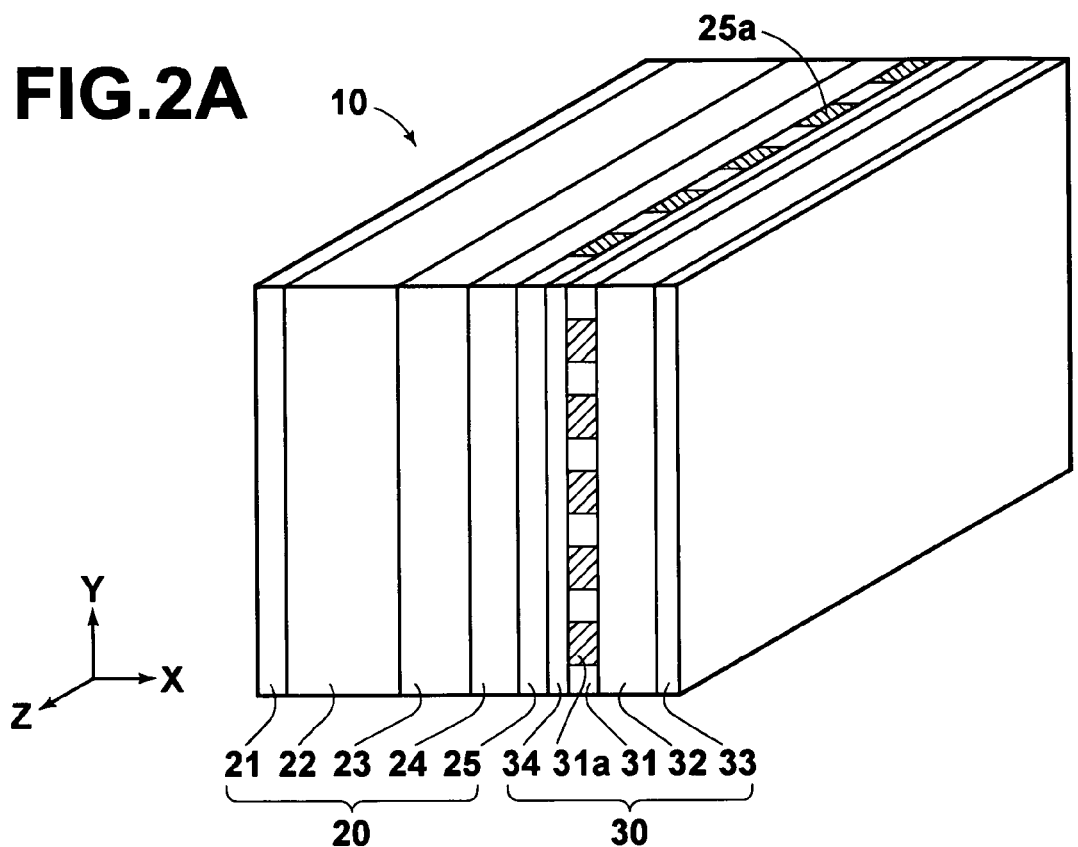
FIG. 2A is a perspective view of a solid-state radiation detector used for the radiation detecting cassette in FIG. 1.
Figure 2B:
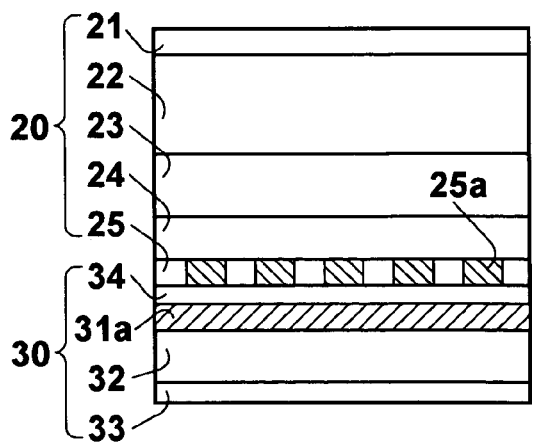
FIG. 2B is a cross sectional view taken through plane X-Y of FIG. 2A.
Figure 2C:
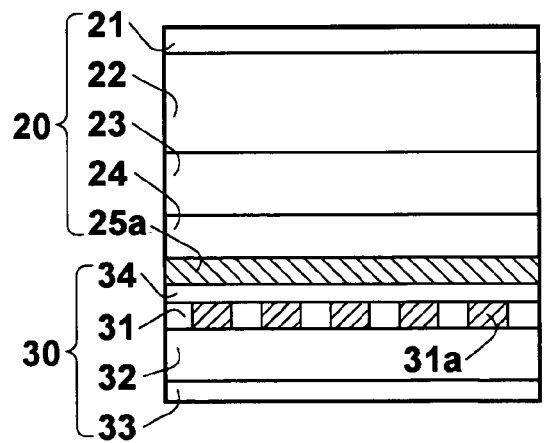
FIG. 2C is a cross sectional view taken through plane X-Z of FIG. 2A.
Figure 3:
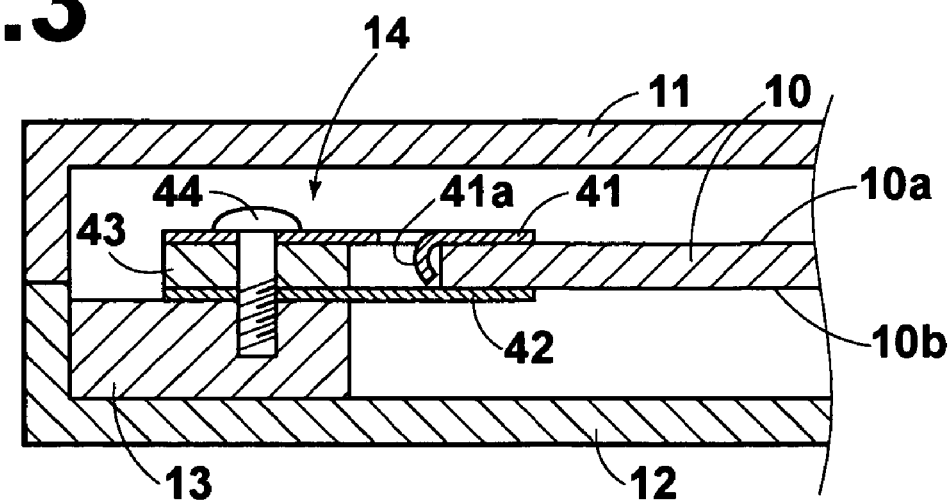
FIG. 3 is a cross sectional view of the radiation detecting cassette including the upper shell half, taken along line III—III of FIG. 1.

The present invention will now be explained in connection with embodiments thereof with reference to the accompanying drawings. FIG. 1 is a plan view of an embodiment of a radiation detecting cassette according to the invention, with an upper shell half removed, FIG. 2A is a perspective view of a solid-state radiation detector used for the radiation detecting cassette in FIG. 1, and FIG. 2B is a cross sectional view taken through plane X-Y of FIG. 2A, FIG. 2C is a cross sectional view taken through plane X-Z of FIG. 2A, and FIG. 3 is a cross sectional view of the radiation detecting cassette including the upper shell half, taken along line III—III of FIG. 1.

A radiation detecting cassette 1 comprises a casing constituted by upper and lower shell halves 11, 12, and a frame 13 fixed in the shell halves. The radiation detecting cassette 1 includes a solid-state radiation detector 10 which is an image pickup device, an electric circuit board (not shown) for providing an image signal by detecting a current from the solid-state radiation detector 10, a flexible circuit board (not shown) for connecting the solid-state radiation detector 10 and the electric circuit board, and a power supply unit (not shown), all of which are housed in the casing.

The solid-state radiation detector 10 has a layered structure formed by placing in mutually superposed relationship a solid-state radiation detecting section 20 and a planar light source section 30 on a glass substrate (not shown).

The solid-state radiation detecting section 20 serves to record radiation image information as a latent image, and generate an electric current corresponding to the latent image as the electrostatic latent image is scanned by a recording electromagnetic wave (hereinafter referred to as reading light). The solid-state radiation detecting section 20 is constituted by: a first electrically conductive layer 21 which is permeable to recording radiation such as X-ray passing through an object (hereinafter referred to as recording light); a recording photoconductive layer 22 which generates a charge upon exposure to the recording light and exhibits electric conductivity; a charge transfer layer 23 which behaves like a substantially insulating material to a charge of the latent image polarity (a negative charge) accumulated in the first conductive layer 21 and behaves like a substantially conductive material to a charge of the transfer polarity (a positive charge, in this example) opposite to that of the latent image polarity; a reading photoconductive layer 24 which generates an electric current upon exposure to the reading light and exhibits conductivity; and a second electrically conductive layer 25 permeable to the reading light. They are arranged in this order. A charge accumulating section is formed at the interface between the recording photoconductive layer 22 and the charge transfer layer 23.

The first electrically conductive layer 21 and second electrically conductive layer 25 serve as electrodes, respectively. The electrode constituted by the first conductive layer 21 is a two-dimensional flat plate electrode, while the electrode constituted by the second electrically conductive layer 25 is a stripe electrode constructed of a large number of electrode elements (line electrode elements) 25a disposed at intervals of a pixel pitch (for example, electrostatically recording medium disclosed in Patent Reference 1). The arranging direction of the elements 25a is the main scanning direction, and the longitudinal direction of the elements 25a is the sub-scanning direction. Each element 25a is connected to a current detecting device on the electric circuit board via the flexible circuit board.

Preferably, the reading photoconductive layer 24 is made of a material which is high in sensitivity to an electromagnetic wave in near-ultraviolet to blue region (300 to 550 nm) and low in sensitivity to an electromagnetic wave in red region (not shorter than 700 nm), e.g., a photoconductive material containing as a major component at least one of a-Se, $PbI_2$, $Bi_{12}$(Ge, Si) $O_{20}$, perylenebisimide (R=n-propyl) and perylenebisimide (R=n-neopentyl). In the embodiment shown, a-Se is used.

The planar light source section 30 is an EL (electroluminescent) light emitter and constituted by an electrically conductive layer 31, an EL layer 32, and an electrically conductive layer 33. An insulating layer 34 is disposed between the second electrically conductive layer 25 of the solid-state radiation detecting section 20 and the electrically conductive layer 33. The electrically conductive layer 31 is a stripe electrode constructed of a large number of electrode elements (line electrode elements) 31a disposed at intervals of a pixel pitch such that each electrode element 31a extends transversely of (in this embodiment, substantially perpendicular to) the elements 25a of the solid-state radiation detecting section 20. Thus, a large number of linear light sources which are respectively constituted by electrode elements 31a (the hatched region in the drawing) are arrayed in a planar state. Each of the elements 31a is connected to a light source controlling device on the electric circuit board via the flexible circuit board. The respective elements 31a are made of a material that transmits the EL light from the EL layer 32. The electrically conductive layer 33 is a plate electrode made of a material by which the EL light from the EL layer 32 is completely reflected.

Either for each element 31a separately or for a plurality of elements 31a at the same time, the light source controlling device applies a predetermined voltage between at least one of the elements 31a and the electrically conductive layer 33 located opposite thereto. More particularly, the light source controlling device applies a predetermined DC voltage between the element (or elements) 31a and the electrically conductive layer 33 by sequentially selecting the elements 31a in groups of a predetermined number. As the DC voltage is applied, EL light is emitted from a portion of the EL layer 32 positioned between the relevant element 31a and the electrically conductive layer 33. Since the element 31a is linear in shape, the EL light transmitted through the element 31a is utilized as linear reading light. Thus, the planar light source section 30 becomes equivalent to those constructed of a large number of minute linear light sources arranged in a plane. EL-emission is produced by sequentially selecting a predetermined number of the elements 31a, so that the solid-state radiation detecting section 20 is electrically scanned by the reading light.

As is mentioned above, since the reading photoconductive layer 24 is made of a material which is high in sensitivity to an electromagnetic wave in near-ultraviolet to blue region (300 to 550 nm) and low in sensitivity to an electromagnetic wave in red region (not shorter than 700 nm), the planar light source section 30 (EL emitter) is required to be made of a material which emits light having an electromagnetic wave in near-ultraviolet to blue region in blue region (550 nm or less).

The solid-state radiation detector 10 is supported by holders 14 which are fixed to four corners of the frame 13 of the casing.

Each holder 14 is constituted by a plate spring 42 disposed on a lower surface 10b side of the solid-state radiation detector 10, a spacer 43 having a height substantially same as that of the solid-state radiation detector 10, and a plate spring 41 disposed on an upper surface 10a side of the solid-state radiation detector 10. The plate spring 42, the spacer 43, and the plate spring 41 are arranged in this order and fixed to the frame 13 by a screw 44.

The solid-state radiation detector 10 is sandwiched between the plate springs 41 and 42. The plate springs 41 and 42 support the solid-state radiation detector 10 at a portion not overlapping to the frame 13 as taken along the arranging direction mentioned above. The plate springs 41 and 42 are electrically conductive, and connected to the electric circuit board in a manner electrically independent of one another. The plate spring 41 serves as an electrode connecting the first electrically conductive layer 21 to the electric circuit board, while the plate spring 42 serves as another electrode connecting the electrically conductive layer 33 to the electric circuit board.

The plate springs 41 and 42 are preferably made of a material which is electrically conductive, which is sufficiently rigid to maintain the positional precision of the solid-state radiation detector 10 within the casing at normal times, and which is sufficiently flexible to absorb a shock when subjected to impact. Specifically, for example, phosphor bronze and resin are preferable as the material. When resin is employed, it is desirable to give electrical conductivity to the resin by embedding or adding therein an electrically conductive material.

The solid-state radiation detector 10 is supported by the aforementioned holders 14 only. This enables to improve the positional precision of the solid-state radiation detector 10 within the casing while ensuring a shock resistance in a vertical direction (a direction perpendicular to the plane of the paper in FIG. 1).

Bent portions 41a are formed in the plate springs 41 to be positioned at the four corners of the frame 13, one at each corner. The bent portions 41a are provided in the plate spring 41 (two in each plate spring) so as to be in contact with two sides of each corner of the solid-state radiation detector 10. These bent portions 41a limit lateral shifting of the solid-state radiation detector 10 and serve as a plate spring, whereby absorbing a shock applied in a lateral direction (a direction parallel to the plane of the paper in FIG. 1)

Employing the aforementioned configuration enables to improve the positional precision of the solid-state radiation detector 10 within the casing while ensuring a shock resistance in both vertical and lateral directions While a specific embodiment of the radiation detecting cassette of the invention has been described, the number and position of the holders supporting the solid-state radiation detector are not limited to those described above. For example, the holders may support near the middle of each edge of the solid-state radiation detector.

Further, another member may be used for supporting the solid-state radiation detector as long as such a member does not prevent shock absorption of the plate springs.

As is described above, the solid-state radiation detector can be sandwiched and held between the plate springs by decreasing the distance between the upper and lower plate springs in a state that the solid-state radiation detector is not sandwiched between the upper and lower plate springs (i.e., in a free state) to a distance less than the thickness of the solid-state radiation detector. This ensures that the solid-state radiation detector is firmly held between the springs and enables to limit lateral shifting of the radiation detector.

What is claimed is:

1. A radiation detecting cassette comprising: a plate-type solid-state radiation detector for recording image information carried by radiation upon exposure to the radiation and supplying an image signal representing the recorded image information; and a casing for accommodating therein the solid-state radiation detector,
   wherein the radiation detecting cassette further comprises plate springs disposed within and secured to the casing, and the solid-state radiation detector is sandwiched between the plate springs such that the upper and lower surfaces of the solid-state radiation detector are supported by the plate springs.

2. A radiation detecting cassette according to claim 1, wherein each of the plate springs includes bent portions which limit lateral shifting of the solid-state radiation detector and which provides the function of a plate spring.

3. A radiation detecting cassette according to claim 1, wherein the plate springs are formed as at least two electrically independent components and function as electrodes connected to the radiation detecting cassette.

4. A radiation detecting cassette according to claim 2, wherein the plate springs are formed as at least two electrically independent components and function as electrodes connected to the radiation detecting cassette.

5. A radiation detecting cassette according to claim 1, wherein each of the plate spring includes a shift-limiting portion which contacts a side surface of the solid-state radiation detector and thereby limits shifting of the solid-state radiation detector.

6. A radiation detecting cassette according to claim 2, wherein each of the plate spring includes a shift-limiting portion which contacts a side surface of the solid-state radiation detector and thereby limits shifting of the solid-state radiation detector.

7. A radiation detecting cassette according to claim 3, wherein each of the plate spring includes a shift-limiting portion which contacts a side surface of the solid-state radiation detector and thereby limits shifting of the solid-state radiation detector.

8. A radiation detecting cassette according to claim 4, wherein each of the plate spring includes a shift-limiting portion which contacts a side surface of the solid-state radiation detector and thereby limits shifting of the solid-state radiation detector.

9. A radiation detecting cassette according to claim 1, wherein said casing includes a frame, and said plate springs are positioned at said frame, so that said solid-state radiation detector does not overlap with the frame.

* * * * *